(12) United States Patent  
Otsuka

(10) Patent No.: US 10,576,618 B2  
(45) Date of Patent: Mar. 3, 2020

(54) ROBOT HAVING COMMUNICATION WITH HUMAN, ROBOT CONTROL METHOD, AND NON-TRANSITORY RECORDING MEDIUM

(71) Applicant: CASIO COMPUTER CO., LTD., Tokyo (JP)

(72) Inventor: Toshihiko Otsuka, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 245 days.

(21) Appl. No.: 15/453,252

(22) Filed: Mar. 8, 2017

(65) Prior Publication Data

US 2017/0368678 A1 Dec. 28, 2017

(30) Foreign Application Priority Data

Jun. 23, 2016 (JP) ................................. 2016-124224

(51) Int. Cl.  
*G06F 19/00* (2018.01)  
*B25J 9/00* (2006.01)  
*A63H 11/00* (2006.01)  
*B25J 13/08* (2006.01)

(52) U.S. Cl.  
CPC ............ *B25J 9/0003* (2013.01); *A63H 11/00* (2013.01); *B25J 13/084* (2013.01); *A63H 2200/00* (2013.01); *Y10S 901/01* (2013.01)

(58) Field of Classification Search  
CPC ....... B25J 9/0003; B25J 13/084; A63H 11/00; A63H 2200/00; Y10S 901/01  
See application file for complete search history.

(56) References Cited

U.S. PATENT DOCUMENTS

| 6,505,098 | B1* | 1/2003 | Sakamoto | ................. A63H 3/52 700/215 |
| 7,760,253 | B2* | 7/2010 | DiCarlo | ............... H04N 17/002 348/223.1 |
| 2002/0016128 | A1* | 2/2002 | Saito | ........................ A63H 3/28 446/268 |
| 2007/0192910 | A1* | 8/2007 | Vu | .......................... B25J 5/007 700/245 |

(Continued)

FOREIGN PATENT DOCUMENTS

| JP | H10-289006 A | 10/1998 |
| JP | H11-143849 A | 5/1999 |

(Continued)

OTHER PUBLICATIONS

Notification of Reasons for Refusal dated Jan. 23, 2018 received in Japanese Patent Application No. JP 2016-124224 together with an English language translation.

*Primary Examiner* — Ian Jen  
(74) *Attorney, Agent, or Firm* — Scully, Scott, Murphy & Presser, P.C.

(57) ABSTRACT

A robot includes a mover, a determiner, and a controller. The mover moves the robot. The determiner determines a touch type by a predetermined object. The controller controls the mover so as to move the robot close to the predetermined object when the determiner determines that the touch type by the predetermined object is petting, or so as to move the robot apart from the predetermined object when the determiner determines that the touch type by the predetermined object is to hitting.

17 Claims, 10 Drawing Sheets

(56) References Cited

U.S. PATENT DOCUMENTS

2012/0182392 A1\* 7/2012 Kearns .................... B25J 5/007
  348/46
2014/0279733 A1\* 9/2014 Djugash .............. G06F 19/3418
  706/12

FOREIGN PATENT DOCUMENTS

| JP | 2001-191280 A | 7/2001 |
| JP | 2002-018146 A | 1/2002 |
| JP | 2002-178282 A | 6/2002 |
| JP | 2003-190651 A | 7/2003 |
| JP | 2003-326479 A | 11/2003 |
| JP | 2004-066418 A | 3/2004 |
| JP | 2007-105803 A | 4/2007 |
| JP | 2009-297829 A | 12/2009 |
| JP | 2012-239557 A | 12/2012 |

\* cited by examiner

FIG.1A
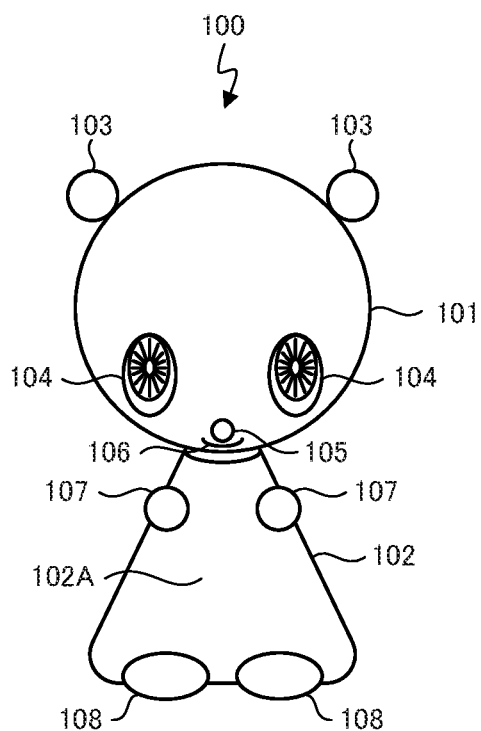
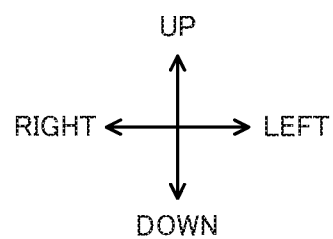
FIG.1B
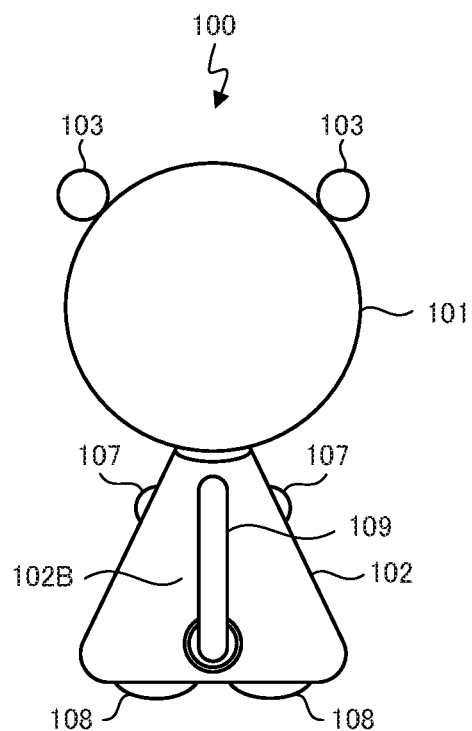
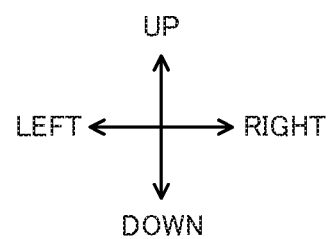

FIG.3

TOUCH REACTION TABLE (FOR FIRST ACTION MODE)

| TOUCH PART | TOUCH TYPE | FIRST REACTION | SECOND REACTION | DECISION RATE |
|---|---|---|---|---|
| HEAD | PETTING | MOVE SO AS TO COME CLOSE TO PREDETERMINED OBJECT (CLOSE MOVEMENT) | CLOSE EYELIDS | 35% |
| | | | STOP MOTIONS OF HANDS AND LEGS | 10% |
| | | | GET HASHFUL | 5% |
| | | | NONE | 50% |
| | HITTING | MOVE SO AS TO BE APART FROM PREDETERMINED OBJECT (APART MOVEMENT) | TONGUE | 30% |
| | | | GNAR | 15% |
| | | | SHAKE HEAD HORIZONTALLY | 5% |
| | | | NONE | 50% |
| ABDOMEN | PETTING | MOVE SO AS TO COME CLOSE TO PREDETERMINED OBJECT (CLOSE MOVEMENT) | CLOSE EYELIDS | 35% |
| | | | OPEN MOUTH | 10% |
| | | | NOD | 5% |
| | | | NONE | 50% |
| | HITTING | MOVE SO AS TO BE APART FROM PREDETERMINED OBJECT (APART MOVEMENT) | TONGUE | 30% |
| | | | GNAR | 15% |
| | | | DIRECT BACK TO PREDETERMINED OBJECT | 5% |
| | | | NONE | 50% |
| BACK | PETTING | MOVE SO AS TO COME CLOSE TO PREDETERMINED OBJECT (CLOSE MOVEMENT) | CLOSE EYELIDS | 35% |
| | | | STOP MOTION OF TAIL | 10% |
| | | | NOD | 5% |
| | | | NONE | 50% |
| | HITTING | MOVE SO AS TO BE APART FROM PREDETERMINED OBJECT (APART MOVEMENT) | TONGUE | 30% |
| | | | GNAR | 15% |
| | | | DIRECT ABDOMEN TO PREDETERMINED OBJECT | 5% |
| | | | NONE | 50% |

FIG.5

TOUCH REACTION TABLE (FOR SECOND ACTION MODE)

| TOUCH PART | TOUCH TYPE | FIRST REACTION | SECOND REACTION | DECISION RATE |
|---|---|---|---|---|
| HEAD | PETTING | MOVE SO AS TO COME CLOSE TO PREDETERMINED OBJECT (CLOSE MOVEMENT) | CLOSE EYELIDS | 50% |
| | | | STOP MOTIONS OF HANDS AND LEGS | 30% |
| | | | LAUGH | 15% |
| | | | NONE | 5% |
| | HITTING | MOVE SO AS TO BE APART FROM PREDETERMINED OBJECT (APART MOVEMENT) | LOOK DOWN | 45% |
| | | | SHAKE HEAD HORIZONTALLY | 30% |
| | | | QUAKE | 20% |
| | | | NONE | 5% |
| ABDOMEN | PETTING | MOVE SO AS TO COME CLOSE TO PREDETERMINED OBJECT (CLOSE MOVEMENT) | CLOSE EYELIDS | 45% |
| | | | OPEN MOUTH | 30% |
| | | | SING | 20% |
| | | | NONE | 5% |
| | HITTING | MOVE SO AS TO BE APART FROM PREDETERMINED OBJECT (APART MOVEMENT) | HIDE | 45% |
| | | | RAISE HAND | 30% |
| | | | BARK | 20% |
| | | | NONE | 5% |
| BACK | PETTING | MOVE SO AS TO COME CLOSE TO PREDETERMINED OBJECT (CLOSE MOVEMENT) | CLOSE EYELIDS | 45% |
| | | | STOP MOTION | 30% |
| | | | LAUGH | 20% |
| | | | NONE | 5% |
| | HITTING | MOVE SO AS TO BE APART FROM PREDETERMINED OBJECT (APART MOVEMENT) | BARK | 45% |
| | | | LOOK ASIDE | 30% |
| | | | DIRECT ABDOMEN TO PREDETERMINED OBJECT | 20% |
| | | | NONE | 5% |

FIG.6

TOUCH_INTENSITY_INDEX-MOVING_SPEED
ASSOCIATION TABLE

| TOUCH INTENSITY INDEX | MOVING SPEED [Cm/Sec] |
|---|---|
| S1 | 3 |
| S2 | 5 |
| S3 | 8 |
| S4 | 12 |
| S5 | 15 |
| S6 | 20 |
| S7 | 23 |
| S8 | 25 |
| S9 | 28 |
| S10 | 30 |

FIG.7

TOUCH REQUESTING PART DECISION TABLE

| TOUCH PART | HIGH FREQUENT TOUCH PART | INTERMEDIATE FREQUENT TOUCH PART | LOW FREQUENT TOUCH PART |
|---|---|---|---|
| DECISION RATE | 50 % | 30 % | 20 % |

FIG.8

TOUCH RECORD TABLE

| No. | TOUCH DATE AND HOUR | TOUCH PART | TOUCH TYPE | TOUCH INTENSITY INDEX | ACTION MODE | FIRST REACTION AND SECOND REACTION |
|---|---|---|---|---|---|---|
| 1 | 2016.01.12 10:03 | HEAD | PETTING | S3 | M1 | CLOSE MOVEMENT AND NONE |
| 2 | 2016.01.12 10:12 | HEAD | PETTING | S2 | M1 | CLOSE MOVEMENT AND NONE |
| 3 | 2016.01.13 15:20 | BACK | HITTING | S6 | M1 | APART MOVEMENT AND GNAR |
| 12 | 2016.01.21 10:05 | ABDOMEN | PETTING | S3 | M1 | CLOSE MOVEMENT AND NONE |
| 13 | 2016.01.21 17:40 | ABDOMEN | PETTING | S3 | M2 | CLOSE MOVEMENT AND OPEN MOUTH |
| 14 | 2016.01.22 8:06 | ABDOMEN | HITTING | S8 | M2 | APART MOVEMENT AND HIDE |
| 15 | 2016.01.22 12:21 | BACK | HITTING | S9 | M2 | APART MOVEMENT AND NONE |
| 16 | 2016.01.23 7:45 | ABDOMEN | PETTING | S1 | M2 | CLOSE MOVEMENT AND CLOSE EYELIDS |
| 17 | 2016.01.23 9:07 | ABDOMEN | PETTING | S4 | M1 | CLOSE MOVEMENT AND NONE |
| ... | ......... | ......... | ......... | ......... | ......... | ......... |

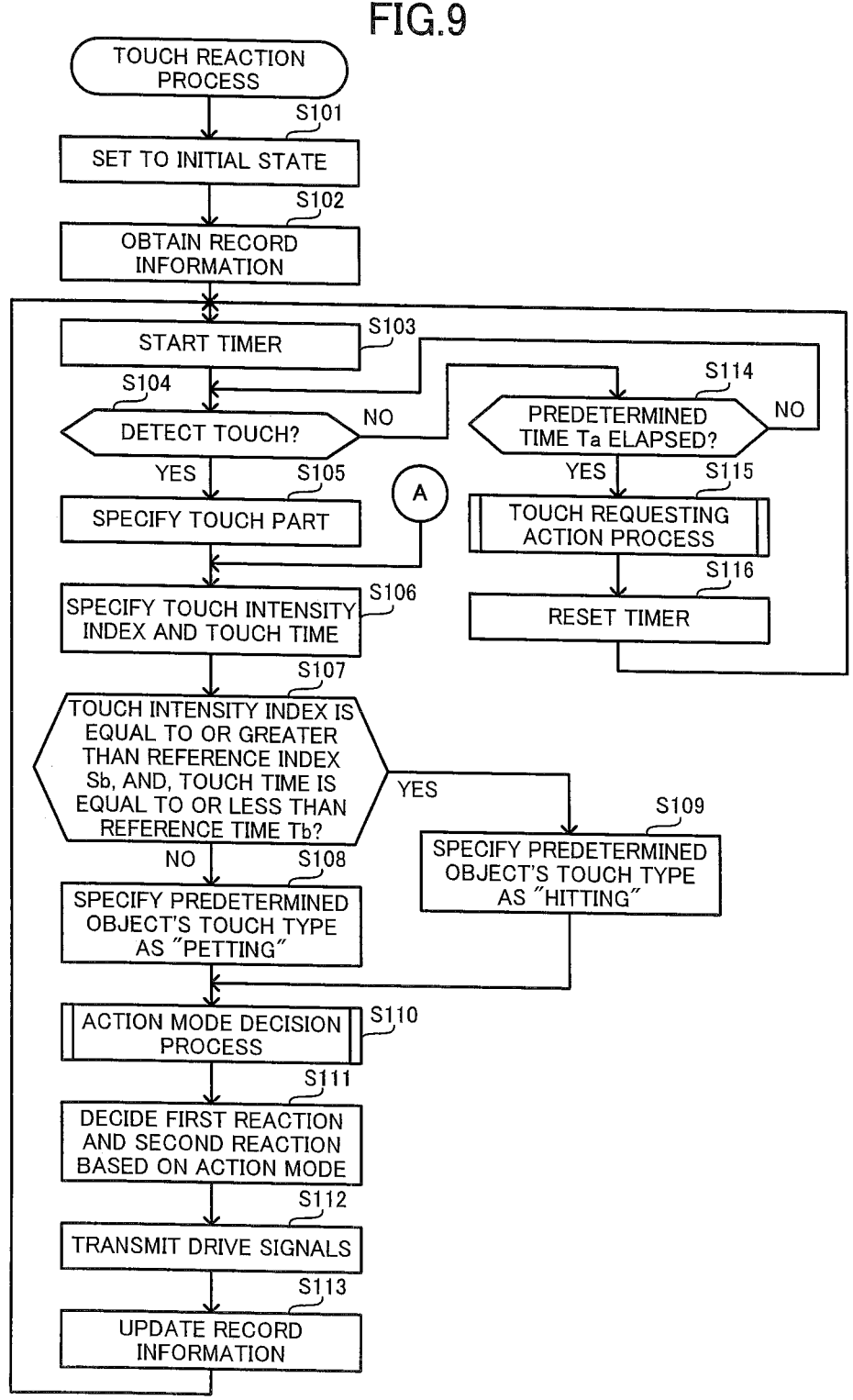

ROBOT HAVING COMMUNICATION WITH HUMAN, ROBOT CONTROL METHOD, AND NON-TRANSITORY RECORDING MEDIUM

CROSS-REFERENCE TO RELATED APPLICATION

This application is based upon and claims the benefit of priority from the prior Japanese Patent Application No. 2016-124224 filed on Jun. 23, 2016, the entire contents of which are incorporated herein by reference.

FIELD

This application relates generally to a robot that communicates with a human, a robot control method, and a non-transitory recording medium.

BACKGROUND

Technologies relating to a robot that have communication with a human are well known in practice. For example, Unexamined Japanese Patent Application Kokai Publication No. 2012-239557 discloses the robot that changes a face expression, and also swings a head and ears as for a reaction when a part of a face displayed on a liquid crystal display device is petted by the human.

SUMMARY

A robot according to a first aspect of a present invention includes:

a mover configured to move the robot;

a determiner configured to determine a touch type by a predetermined object; and a controller configured to control the mover so as to move the robot close to the predetermined object when the determiner determines that the touch type by the predetermined object is petting, or so as to move the robot apart from the predetermined object when the determiner determines that the touch type by the predetermined object is hitting.

A robot control method according to a second aspect of the present invention includes:

moving the robot;

determining a touch type by a predetermined object; and controlling a movement so as to move the robot close to the predetermined object when the touch type by the predetermined object is determined as petting, or so as to move the robot apart from the predetermined object when the touch type by the predetermined object is determined as hitting.

A non-transitory computer readable recording medium according to a third aspect of the present invention has stored therein a program that causes a computer to accomplish a robot control function, the program causing the computer of the robot to:

move the robot;

determine a touch type by a predetermined object; and control a movement so as to move the robot close to the predetermined object when the touch type by the predetermined object is determined as petting, or so as to move the robot apart from the predetermined object when the touch type by the predetermined object is determined as hitting.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the present invention, and together with the general description given above and the detailed description of the embodiments given below, serve to explain the principles of the present invention.

FIG. 1A is a front external appearance view of a robot according to an embodiment of the present invention;

FIG. 1B is a back external appearance view of the robot according to the embodiment of the present invention;

FIG. 3 is a diagram illustrating an example touch reaction table for a first action mode;

FIG. 5 is a diagram illustrating an example touch reaction table for a second action mode;

FIG. 6 is a diagram illustrating an example touch_intensity_index-moving_speed association table;

FIG. 7 is a diagram illustrating an example touch requesting part decision table;

FIG. 8 is a diagram illustrating another example of a touch record table;

FIG. 9 is a flowchart illustrating a flow of a touch reaction process;

DETAILED DESCRIPTION

Figure 2:
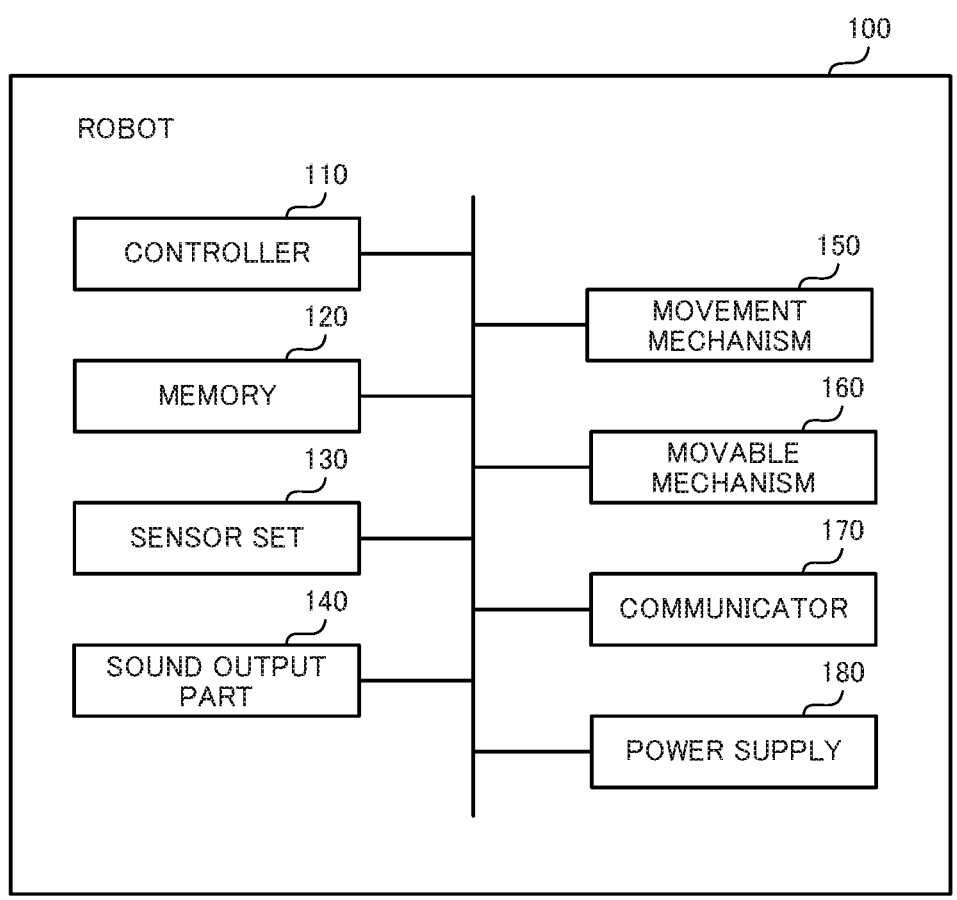
FIG. 2 is a diagram illustrating a functional structure of the robot.

A robot according to an embodiment of the present invention will be explained below with reference to the accompanying figures.

The robot according to the embodiment of the present invention is a robot device that autonomously actions in response to an action like a touch from a predetermined object like a user. As illustrated in FIGS. 1A, 1B, a robot 100 is formed in a three-dimensional shape that has a resembling external appearance like a small dog, and is mainly formed of a hard synthetic resin material like plastic. The robot 100 includes a head 100, a body 102, hands 107, legs 108, and a tail 109. The body 102 includes an abdomen 102A, and a back 102B. In addition, the head 101 includes ears 103, eyes 104, a nose 105, and a mouth 106.

In addition, the robot 100 executes various actions based on two action modes (a first action mode and a second action mode) that are changed in accordance with a touch frequency by the predetermined object.

Functionally, as illustrated in FIG. 2, the robot 100 includes a controller 110, a memory 120, a sensor set 130, a sound output part 140, a movement mechanism 150, a movable mechanism 160, a communicator 170, and a power supply 180.

The controller 110 controls the entire action of the robot 100. The controller 110 is a micro-computer that includes a Central Processing Unit (CPU), a Read Only Memory (ROM), and a Random Access Memory (RAM). The controller 110 causes the CPU to read an action program stored in the ROM and execute the program over the RAM, thereby controlling each component of the robot 100.

The controller 110 creates a control signal to move the robot 100 in accordance with various data obtained from, for example, the sensor set 130 based on the action program, and transmits the control signal to the movement mechanism 150, thereby controlling the movement action of the robot 100.

The memory 120 stores various necessary data for the controller 110 to control each component of the robot 100. The memory 120 includes a non-volatile memory, such as a flash memory or a Hard Disk Drive (HDD). The memory 120 stores, for example, a touch reaction table, a touch_intensity_index-moving_speed association table, a touch requesting part decision table, and a touch record table, in respective predetermined memory areas.

The touch reaction table illustrated in FIG. 3 will be referred in the first action mode, and defines an action to be executed by the robot 100 in reaction to a touch by the predetermined object. The touch reaction table for the first action mode stores respective pieces of data that are "touch part", "touch type", "first reaction", "second reaction", and "decision rate" in association with each other.

The "touch part" is a part of the robot 100 capable of detecting the touch by the predetermined object, and is distinguished into "head", "abdomen", and "back". The "touch type" is classified in accordance with how the predetermined object touches the robot 100, and is classified into "petting" indicating a petting action for the robot 100 by the predetermined object, and "hitting" indicating a hitting action for the robot 100 by the predetermined object.

The "first reaction" is the details of the action to be executed in accordance with the touch by the predetermined object. As for the "first reaction", "movement so as to come close to the predetermined object (close movement)" is defined for the touch type "petting" regardless of the "touch part", while "movement so as to become apart from the predetermined object (apart movement)" is defined for the touch type "hitting".

Figure 4A:
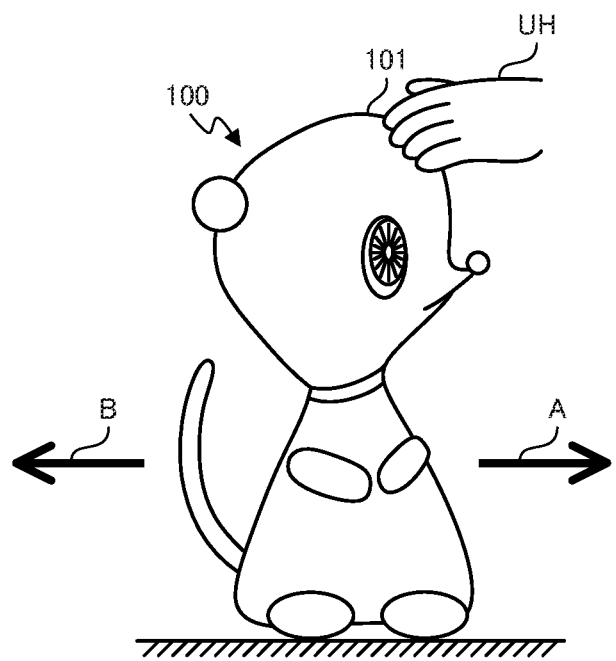
FIG. 4A is a diagram illustrating a status of the robot when touched by a predetermined object.
Figure 4B:
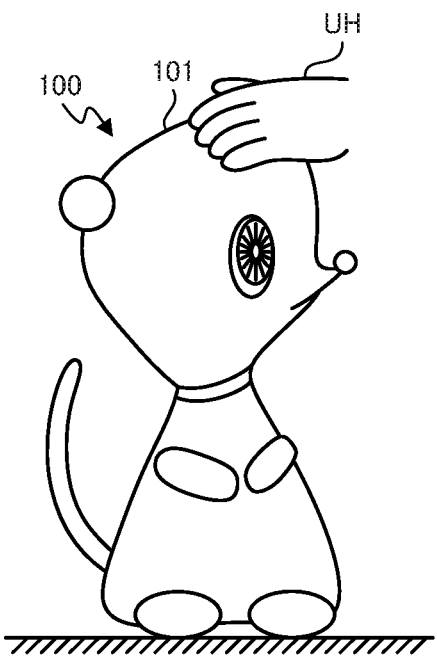
FIG. 4B is a diagram illustrating a status of the robot when executing a reaction in accordance with a touch type.
Figure 4C:
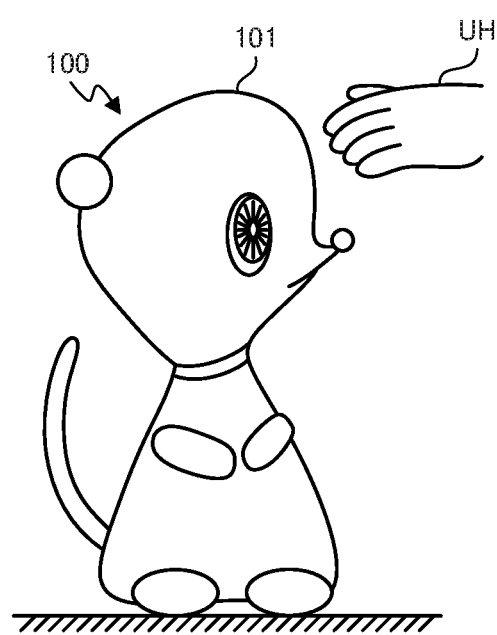
FIG. 4C is a diagram illustrating a status of the robot when executing a reaction in accordance with a touch type.

As illustrated in FIG. 4A, when a hand UH of the predetermined object touches the head 101 of the robot 100, how the robot 100 moves becomes different in accordance with whether the touch type is "petting" or "hitting". In the case of the touch type "petting", the robot 100 moves in a direction indicated by an arrow A so as to come close to the predetermined object, and as illustrated in FIG. 4B, the hand UH of the predetermined object further becomes intimately in contact with the head 101. Conversely, in the case of the touch type "hitting", the robot 100 moves in a direction indicated by an arrow B so as to move apart from the predetermined object, and as illustrated in FIG. 4C, the hand UH of the predetermined object becomes apart from the head 101. As explained above, the robot 100 favorably accepts the action by the predetermined object when petted, and executes an action to come close to the predetermined object so as to have more opportunities to be petted. Conversely, when hit by the predetermined object, the robot 100 rejects the action by the predetermined object, and executes an action to become apart from the predetermined object so as to avoid opportunities to be hit.

The "second reaction" is the details of the action to be executed in sequence to the first reaction. Multiple actions, such as "close eyelids", and "stop motions of hands and legs", are prepared for the "second reaction", and the different "decision rate" is allocated to each action. The "decision rate" is, for example, a rate when the entire range of a value to be taken by a random number created by a general scheme is defined as being 100. In addition, a favorable action is generally defined for the touch type "petting", but a repulsive action is generally defined for the touch type "hitting". Still further, the different action is allocated depending on the touch part.

The touch reaction table illustrated in FIG. 5 will be referred in the second action mode, and defines an action to be executed by the robot 100 in response to a touch by the predetermined object. Like the touch reaction table for the first action mode illustrated in FIG. 3, the touch reaction table for the second action mode stores respective pieces of data that are "touch part", "touch type", "first reaction", "second reaction", and "decision rate" in association with each other.

In this case, when the touch reaction table for the first action mode is compared with the touch reaction table for the second action mode, both tables have different details for the second reaction and different distributions for the decision rate.

In the touch reaction table for the second action mode, the decision rate (5%) allocated to "none" indicating non-execution of the second reaction is set to be remarkably lower than the decision rate (50%) allocated to "none" in the touch reaction table for the first action mode. This indicates that the probability of the execution of the second reaction in sequence to the first reaction is high in the second action mode.

The details of the second reaction to the touch action "hitting" in the touch reaction table for the second action mode are mainly further negative actions than the repulsive action in comparison with the details of the second reaction to the touch type "hitting" in the touch reaction table for the first action mode. Hence, in the second action mode, a possibility that the predetermined object has a feeling like thinking-over or a regret with respect to hitting of the robot 100 becomes high. Accordingly, an increase in opportunity of petting the robot 100 is expected.

As explained above, depending on whether or not the action mode is the first action mode or the second action mode, by referring to the respective touch reaction tables setting the different action details and the different decision rate, a reaction with an excellent variability relative to the touch is to be executed.

The touch_intensity_index-moving_speed association table stores, as illustrated in FIG. 6, respective pieces of data that are "touch intensity index" and "moving speed" in association with each other. The "touch intensity index" may be set as appropriate, but the touch intensity index according to this embodiment is an index indicating the touch intensity by 10 levels, such as S1 to S10. The touch intensity indexes S1 to S10 have a relationship such that S1<S2< . . . <S9<S10, and the larger the number subsequent to "S" is, the greater the indicated touch intensity is. The "moving speed" indicates a speed of autonomous movement of the robot 100. The controller 110 refers to the touch_intensity_index-moving_speed association table, and decides the moving speed of the robot 100 in accordance with the touch intensity index.

As illustrated in FIG. 7, the touch requesting part decision table allocates different decision rates to "high frequent touch part", "intermediate frequent touch part", and "low frequent touch part", respectively. Each touch part "head", "abdomen", and "back" are associated with the "high frequent touch part", "intermediate frequent touch part", and "low frequent touch part" in the sequence of the larger number of petting times. In the touch requesting part decision table illustrated in FIG. 7, the highest decision rate is allocated to the "high frequent touch part", the lowest decision rate is allocated to the "low frequent touch part". The controller 110 refers to the touch requesting part decision table, and decides a touch requesting part that requests the predetermined object to touch in a touch requesting action process to be explained later.

The touch record table is a table that collects the responses executed by the robot 100 in a time-series manner with respect to a touch date and hour by the predetermined object, and the touch by the predetermined object. As illustrated in FIG. 8, the touch record table stores respective pieces of data that are "touch date and hour", "touch part", "touch type", "touch intensity index", "action mode", and "first response and second response" in association with each other. The "touch date and hour" indicates the date and hour at which the touch by the predetermined object is detected. The "touch part" and the "touch type" are the same as the "touch part" and "touch type" in the above touch reaction table, respectively. The "touch intensity index" is the same as that of the above touch_intensity_index-moving_speed association table. The "action mode" indicates the type of the action mode when the reaction is executed. In the "action mode", "M1" indicates a status in which the first action mode is set, while "M2" indicates a status in which the second action mode is set. The "first reaction and second reaction" indicates the details of the combination of the first reaction with the second reaction executed in response to the touch by the predetermined object. The touch record table is updated every time the reaction is executed in response to the touch by the predetermined object.

The sensor set 130 obtains information (physical quantity) indicating the external status of the robot 100 and the internal status thereof, converts the obtained information into a predetermined signal as needed, and supplies the predetermined signal to the controller 110. The sensor set 130 includes, for example, an acceleration sensor, an angular velocity sensor, a distance sensor, an image sensor, and a microphone. For example, the acceleration sensor and the angular velocity sensor are embedded in the body 102, the distance sensor and the image sensor are embedded in the eyes 104, and the microphone is embedded in the ears 103.

The sound output part 140 includes a speaker and a sound output interface, converts sound data created by the controller 110 into sounds, and outputs the sounds to the exterior. The speaker is, for example, placed in a manner embedded in the mouth 106. The robot 100 collects the sounds from the predetermined object by the microphone of the sensor set 130, and outputs, from the sound output part 140, the sounds responding to uttered details by the predetermined object under the control by the controller 110, thereby enabling a simple conversation with the predetermined object.

The movement mechanism 150 is a component to move the robot 100. The movement mechanism 150 includes right and left wheels provided at the bottoms of the respective legs 108 of the robot, motors that turn and drive the right and left wheels, respectively, and a drive circuit that drives the motors. The drive circuit supplies a drive pulse signal for the motor in accordance with the received control signal from the controller 110. The motor turns and drives the right or left corresponding wheel in accordance with the drive pulse signal, and moves the robot 100. As explained above, the movement mechanism 150 serves as a mover that moves the robot 100. As long as the right and left wheels are capable of independently turning and being driven to enable the robot 100 to move forward, backward, turn, accelerate and decelerate, and the like, the number of motors is optional. For example, a single motor may drive the right and left wheels via a linkage mechanism or a steering mechanism. In addition, the number of drive circuits may be changed as appropriate in accordance with the number of motors.

The movable mechanism 160 is a component that displaces the other component upon a drive by a drive member like an actuator. The movable mechanism 160 includes to-be-driven members, such as the head 101, the hands 107, the legs 108, and the tail 109, the drive member like the actuator that drives the to-be-driven member, and a drive circuit that drives and controls the drive member. The robot 100 displaces the to-be-driven member in accordance with the control by the controller 110, thereby moving the hands and legs, shaking the head up, down, right and left, and opening and closing the eyelids, and the like.

The communicator 170 includes a wireless communication module and an antenna, and performs data communication with an external device.

The power supply 180 includes a power-supply circuit, a battery, and the like, and supplies power to each component of the robot 100 in accordance with an instruction from the controller 110.

Next, an explanation will be given of the touch reaction process to be executed by the robot 100 with reference to a flowchart that is FIG. 9. The touch reaction process is a process of deciding and executing the action of the robot 100 in response to the touch by the predetermined object. The controller 110 responds to a turn ON of the robot 100 upon an operation given by the predetermined object, and starts the touch reaction process.

When starting the touch reaction process, first, the controller 110 reads the initial data stored in the predetermined memory area of the memory 120, and sets (step S101) each component of the robot 100 to be an initial state. Next, the controller 110 refers to the touch record table stored in the memory 120, and obtains (step S102) touch record information.

Subsequently, the controller starts (step S103) a timer counting in order to measure a touchless time at which no touch is given by the predetermined object. In addition, the controller 110 controls the movement mechanism 150 and the movable mechanism 160, moves the robot 100 at random within the real space where the robot 100 is placed, and independently and slightly swings the head 101, the hands 107, the legs 108, and the tail 109, thereby executing a similar action to that of an actual pet animal.

The controller 110 determines (step S104) whether or not the touch by the predetermined object is detected. The controller 110 may determine the presence or absence of the touch by the predetermined object in accordance with, for example, whether or not new detection data is obtained from the acceleration sensor in the sensor set 130. In this case, the controller 110 and the sensor set 130 serve as an obtainer that obtains touch information indicating a status of the touch by the predetermined object.

When determining that (step S104: YES) the touch by the predetermined object is detected, the controller 110 specifies (step S105) the touch part. The controller 110 analyzes a touch position based on the accelerations in three axial directions (an X-axis direction, a Y-axis direction, and a Z-axis direction) obtained from the acceleration sensor, and specifies any of the head 101, the abdomen 102A, and the back 102B as the touch part by the predetermined object.

In addition, the controller 110 specifies the touch intensity index (S1 to S10) indicating a level of the touch intensity by the predetermined object based on the detection data obtained from the acceleration sensor, and specifies a touch time T indicating a needed time for the predetermined object to touch (step S106).

In this case, a touch intensity S indicating the level of touch intensity by the predetermined object is obtainable by, for example, calculating a square root of sum of squares of the acceleration in each axial direction obtained from the acceleration sensor as expressed by the following formula. The controller 110 specifies any of the touch intensity indexes S1 to S10 corresponding to the touch intensity S calculated based on the following formula.

Touch intensity $S=((\text{acceleration in } X\text{-axis direction})^2+(\text{acceleration in } Y\text{-axis direction})^2+(\text{acceleration in } Z\text{-axis direction})^2)^{1/2}$ In addition, the touch time T is obtainable by, for example, calculating a difference between a detection-data obtainment start time from the acceleration sensor and a detection-data obtainment end time therefrom.

After executing the process in the step S106, the controller 110 determines (step S107) whether or not the touch intensity index is equal to or greater than a reference touch intensity index Sb (for example, the touch intensity index S6), and whether or not the touch time T needed for the predetermined object to touch the robot 100 is equal to or shorter than a reference time Tb (for example, 10 msec.). In this case, the reference intensity index Sb and the reference time Tb are to specify whether the touch type of the predetermined object is "petting" or "hitting". As explained above, the controller 110 serves as a determiner that determines whether the robot 100 is petted or hit by the predetermined object.

When determining that (step S107: YES) the touch intensity index is equal to or greater than the reference intensity index Sb, and the touch time T is equal to or shorter than the reference time Tb, the controller 110 specifies (step S109) that the touch type by the predetermined object is "hitting".

In addition, when determining that (step S107: NO) the touch intensity index is less than the reference intensity index Sb, and the touch time T is longer than the reference time Tb, the controller 110 specifies (step S108) that the touch type by the predetermined object is "petting".

Figure 10:
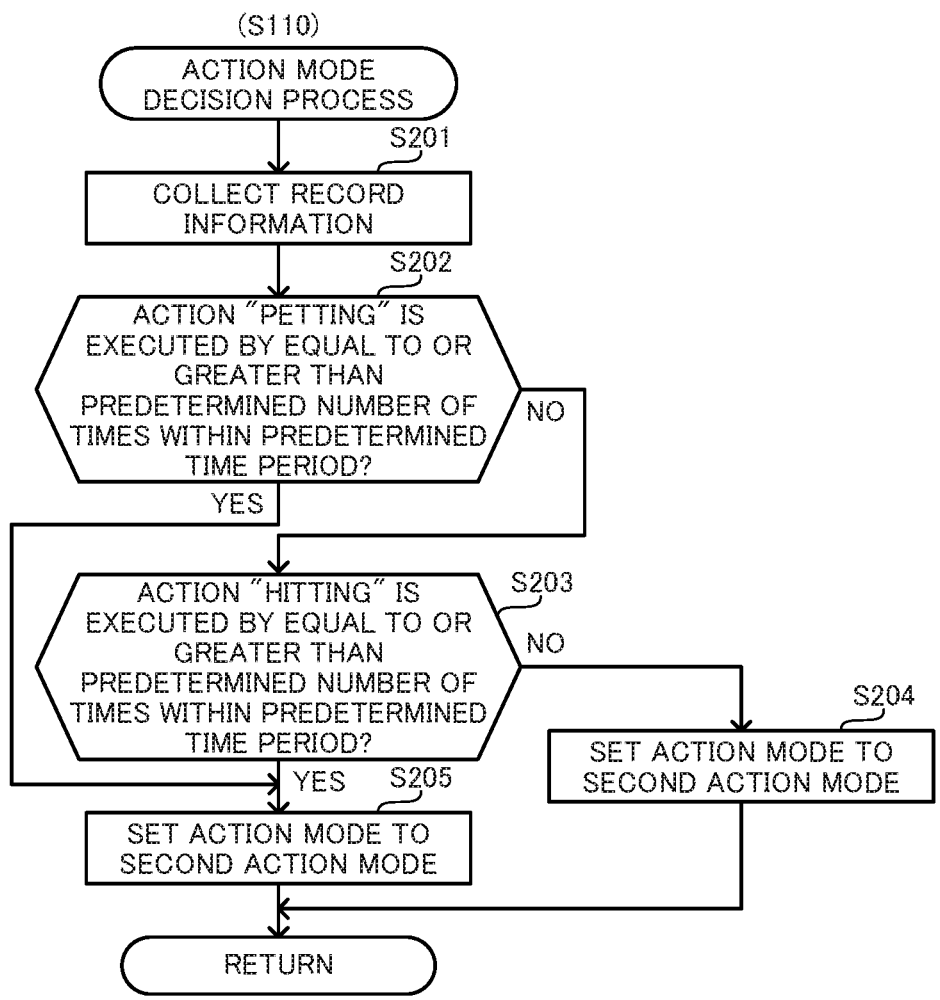
FIG. 10 is a flowchart illustrating a flow of an action mode decision process.

Subsequently, the controller 110 executes an action mode decision process (step S110). This action mode decision process will be explained with reference to a flowchart that is FIG. 10. The action mode decision process is to execute the action by the robot 100 in the different action mode based on the touch frequency by the predetermined object. First, the controller 110 refers to the touch record table when starting the action mode decision process, and collects (step S201) the record information.

Next, the controller 110 determines (step S202) whether or not the touch type "petting" has been made by equal to or greater than a predetermined number of times within a predetermined time period (for example, equal to or greater than 14 times within a past week). When determining that (step S202: NO) the touch type "petting" has not been made by equal to or greater than the predetermined number of times within the predetermined time period, the controller 110 determines (step S203) whether or not the touch type "hitting" has been made by equal to or greater than a predetermined number of times within the predetermined time period (for example, seven times within the past week). When determining that (step S203: NO) the touch type "hitting" has not been made by equal to or greater than the predetermined number of times within the predetermined time period, the controller 110 sets (step S204) the action mode to the first action mode that is applied when the touch frequency by the predetermined object is relatively low.

Conversely, in the process in the step S202, when determining that (step S202: YES) the touch type "petting" has been made by equal to or greater than the predetermined number of times within the predetermined time period, or in the process in the step S203, when determining that (step S203: YES) the touch type "hitting" has been made by equal to or greater than the predetermined number of times within the predetermined time period, the controller 110 sets (step S205) the action mode to the second action mode that is applied when the touch frequency by the predetermined object is relatively high.

After setting the action mode in the step S204 or in the step S205, the controller 110 ends the action mode decision process.

Returning to the flowchart for the touch reaction process illustrated in FIG. 9, after the execution of the process in the step S110, the controller 110 sets (step S111) the action mode to the first action mode or the second action mode based on the decided action mode in the action mode decision process.

In the action mode decision process in the step S110, when the action mode is set to the first action mode, the controller 110 refers to the touch reaction table for the first action mode illustrated in FIG. 3, and decides the first reaction and the second reaction. Conversely, in the action mode decision process in the step S110, when the action mode is set to the second action mode, the controller 110 refers to the touch reaction table for the second action mode illustrated in FIG. 5, and decides the first reaction and the second reaction.

In any cases, the first reaction and the second reaction are decided in accordance with the specified touch part in the step S105 and with the specified touch type in the step S108 or in the step S109. The moving speed for the close movement or the apart movement in the first reaction is set based on the referred touch_intensity_index-moving_speed association table illustrated in FIG. 6, and the specified touch intensity index in the step S106.

The controller 110 creates the drive signals based on the decided first reaction and the second reaction, and transmits (step S112) the drive signals to the movement mechanism 150 and the movable mechanism 160. Hence, the controller 110 controls the action of the movement mechanism 150 and that of the movable mechanism 160.

Subsequently, the controller 110 adds, to the touch record table, the details of the present drive instruction, and the like, thereby updating (step S113) the touch record table.

In the process in the step S104, when determining that (step S104: NO) the touch by the predetermined object is not detected, the controller 110 determines (step S114) whether or not a predetermined time Ta has elapsed. The controller 110 refers to the count value by the timer that has started counting in the step S103, and determines whether or not the predetermined time Ta has elapsed. As for the predetermined time Ta, an appropriate time in view of the touch frequency, and the like (for example, three hours) is set. When determining that (step S114: NO) the predetermined time Ta has not elapsed yet, the controller 110 returns the process to the step S104, and stands by until the touch by the predetermined object is detected or until the predetermined time Ta has elapsed.

Figure 11:
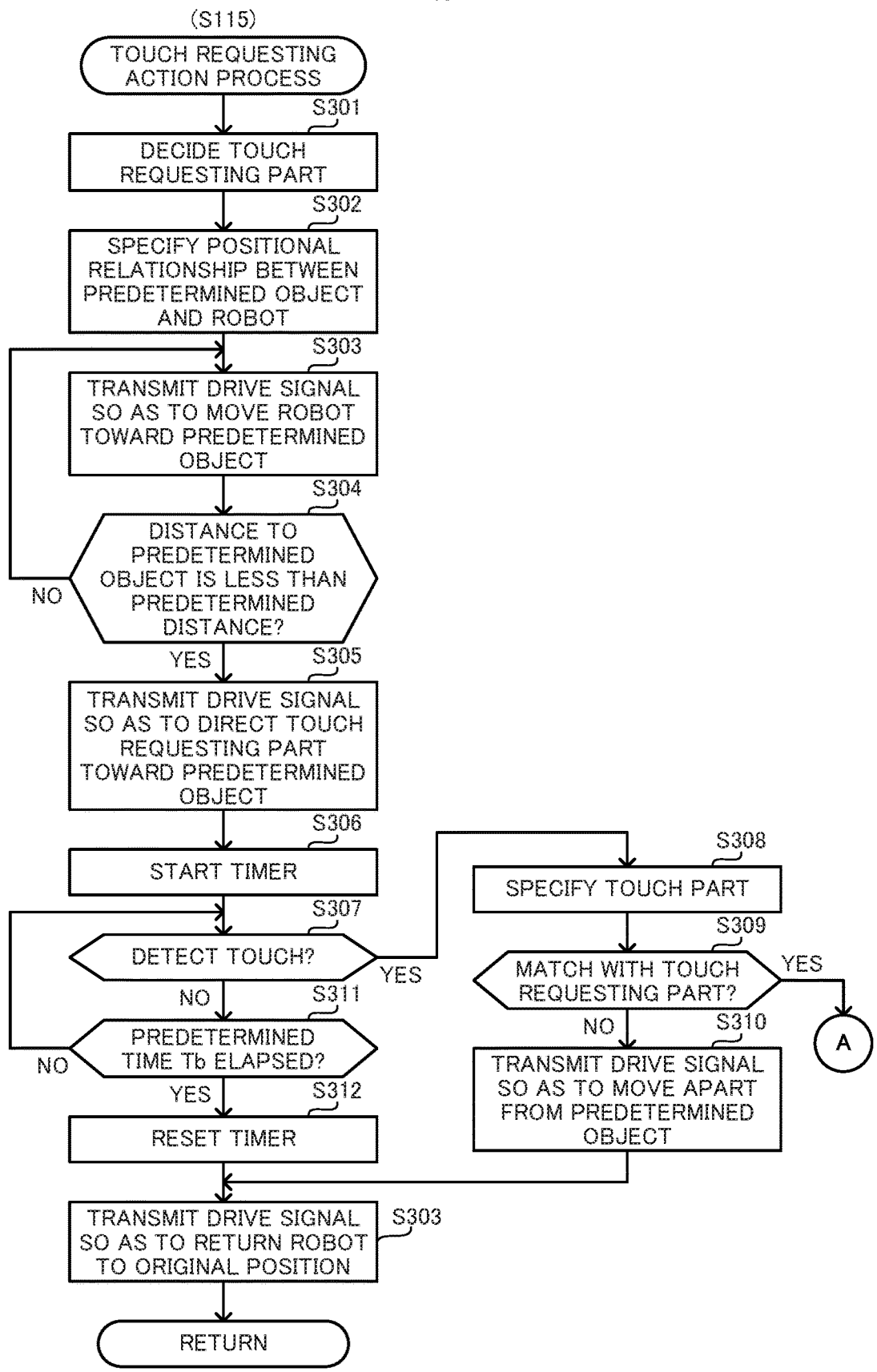
FIG. 11 is a flowchart illustrating a flow of a touch requesting action process.

Conversely, when determining that (step S114: YES) the predetermined time Ta has elapsed, the controller 110 executes a touch requesting action process (step S115). In this case, an explanation will be given of the touch requesting action process with reference to a flowchart that is FIG. 11. The touch requesting action process is to execute an action for requesting the predetermined object to touch.

When starting the touch requesting action process, first, the controller 110 decides (step S301) the touch requesting part. The touch requesting part is a part to be caused to come the closest to the predetermined object so as to be petted by the predetermined object upon execution of the touch requesting action. The controller 110 refers to, for example, the touch record table, counts the number of petted times (the number of executed touch type "petting") of each touch part ("head", "abdomen", and "back"), and allocates the "high frequent touch part", the "intermediate frequent touch part", and "low frequent touch part" in the sequence of the larger number of petted times. Next, the controller 110 refers to the touch requesting part decision table, and decides the touch requesting part based on the allocated decision rate. Hence, the touch requesting part is decided variably in accordance with the number of petted times, and thus the decision on the touch requesting part has a variety.

Next, the controller 110 specifies (step S302) a relative positional relationship between the robot 100 and the predetermined object. The controller 110 specifies the relative positional relationship between the robot 100 and the predetermined object based on various data (for example, distance data from the distance sensor) obtained from the sensor set 130. Next, the controller 110 creates the drive signal to move the robot 100 toward the predetermined object, and transmits (step S303) the drive signal to the movement mechanism 150. Hence, the controller 110 controls the action of the movement mechanism 150.

The controller 110 determines (step S304) whether or not a distance between the robot 100 and the predetermined object is equal or shorter than a predetermined distance (for example, 30 cm), and when the distance between the robot 100 and the predetermined object is longer than the predetermined distance or is equal thereto (step S304: NO), the controller 110 controls the movement mechanism 150 until the robot 100 becomes close to the predetermined object. When determining that (step S304: YES) the robot 100 has become close to the predetermined object so that the distance to the predetermined object is shorter than the predetermined distance, the controller 110 creates the drive signal to direct the touch requesting part toward the predetermined object, and transmits (step S305) the drive signal to the movement mechanism 150 and the movable mechanism 160. Hence, the controller 110 controls the action of the movement mechanism 150 and that of the movable mechanism 160.

After executing the process in the step S305, the controller 110 starts (step S306) a timer counting to measure a standby time until the touch by the predetermined object is detected, and determines (step S307) whether or not the touch by the predetermined object is detected. When determining that (step S307: YES) the touch by the predetermined object is detected, the controller 110 specifies (step S308) the touch part. The controller 110 determines (step S309) whether or not the specified touch part matches the touch requesting part. When determining that (step S309: YES) the touch part matches the touch requesting part, the controller 110 progresses the process to step S106. Conversely, when determining that (step S309: NO) the touch part does not match the touch requesting part, that is, when determining that the touch by the predetermined object is given to a different part from the touch requesting part, the controller 110 creates the drive signal to move the robot 100 apart from the predetermined object, and transmits (step S310) the drive signal to the movement mechanism 150. Hence, the controller 110 controls the action of the movement mechanism 150.

In the process in the step S307, when determining that (step S307: NO) the touch by the predetermined object is not detected, the controller 110 determines (step S311) whether or not a predetermined time Tb has elapsed. As for the predetermined time Tb, an appropriate time to stand by until the touch by the predetermined object is detected is set (for example, three minutes). When determining that (step S311: NO) the predetermined time Tb has not elapsed yet, the controller 110 returns the process to the step S307, and stands by until the touch by the predetermined object is detected or until the predetermined time Tb has elapsed. Conversely, when determining that (step S311: YES) the predetermined time Tb has elapsed, the controller 110 resets (step S312) a counted value by the timer.

After executing the process in the step S310 or the process in the step S312, the controller 110 creates the drive signal to return the robot 100 to the original position (the position of the robot 100 specified in the step S302), and transmits (step S313) the drive signal to the movement mechanism 150. Hence, the controller 110 controls the action of the movement mechanism 150. After executing the process in the step S313, the controller 110 ends the touch requesting action process.

Returning to the flowchart for the touch reaction process illustrated in FIG. 9, after executing the process in the step S115, the controller 110 resets (step S116) the counted value by the timer, and returns the process to the step S103.

As explained above, according to this embodiment, the robot 100 executes, in response to the touch by the predetermined object, a different movement action in accordance with the touch intensity. More specifically, when the touch by the predetermined object is petting the robot 100, the robot 100 moves so as to come close to the predetermined object, and when the touch by the predetermined object is hitting the robot 100, the robot 100 moves so as to become apart from the predetermined object. Hence, the robot 100 takes a different reaction to an action by the predetermined object. This gives an impression to the predetermined object as if the robot 100 has an emotion like a human. Therefore, the robot 100 according to this embodiment enables the predetermined object to keep playing with the robot without getting bored.

In addition, the robot 100 is capable of moving at a different speed in accordance with the touch intensity by the predetermined object. Still further, in conjunction with the movement action, the robot 100 is also capable of taking an action responding to the touch by the predetermined object, such as to close the eyelids. Yet still further, the robot 100 is capable of taking further various actions in accordance with the touch frequency by the predetermined object. Hence, the robot 100 enables the predetermined object to play with the robot 100 for a long time.

The present disclosure is not limited to the above embodiment, and various changes and modifications can be made thereto. For example, the above embodiment can be carried out in modified forms to be explained below.

For example, the robot 100 may have a function of recognizing multiple predetermined objects, and may execute a different action from each of the predetermined objects. For example, the robot 100 may have a face recognizer that recognizes a face of each predetermined object, and may regularly execute a unique action to each predetermined object in accordance with the recognition result by the face recognizer.

In addition, the robot 100 may determine a master-servant relationship and a dependent relationship, and the like for the multiple predetermined objects, and may decide the action to be executed for each of the predetermined objects.

Still further, the robot 100 may obtain environmental information containing, for example, weather, temperature or humidity, and may decide an action to be executed for the predetermined object based on the environmental information.

Yet still further, in the above embodiment, the predetermined object is a user, but may be other than the user as long as the predetermined object is a human. Moreover, the predetermined object may be animals other than the human.

Furthermore, the controller 110 may determine only either petting by the predetermined object or hitting by the predetermined object.

In the above embodiment, the explanation has been given of an example case in which the memory 120 of the robot 100 stores various tables necessary to decide the action to be executed. However, those pieces of data may be stored in an external storage device, and the like. The robot 100 may obtain, as appropriate, necessary data from the external storage device communicable via a communication network. In addition, in the above embodiment, the explanation has been given of an example case in which the controller 110 of the robot 100 controls the action of each component. However, the robot 100 may obtain an instruction from an external device, and may take an action in accordance with the obtained instruction.

For example, the robot 100 may obtain detection data from not only the sensors in the sensor set 130 but also various sensors disposed at an external side of the robot 100.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A robot comprising:
    one or more actuators configured to move the robot; and
    a processor comprising hardware, wherein the processor is configured to:
        determine, in cooperation with one or more sensors, whether a touch type by a predetermined object is a predetermined first touch type or a predetermined second touch type, the touch type being classified in accordance with how the predetermined object touches the robot,
        acquire, in cooperation with the one or more sensors, touch intensity by the predetermined object with the robot,
        control the one or more actuators so as to move the robot closer to the predetermined object when determining that the touch type by the predetermined object is the first touch type, or control the one or more actuators so as to move the robot further away from the predetermined object when determining that the touch type by the predetermined object is the second touch type,
        control the one or more actuators so that the greater the acquired touch intensity is, a moving speed of the robot toward the predetermined object is higher;
        recognize a face of the predetermined object, and
        change control in accordance with a recognition result obtained by recognizing the face of the predetermined object.

2. The robot according to claim 1, wherein the processor is configured to:
    obtain, in cooperation with the one or more sensors, touch information indicating a state of a touch by the predetermined object with the robot, and
    determine whether the touch type by a predetermined object is the first touch type or the second touch type based on whether or not the obtained touch information satisfies a predetermined condition.

3. The robot according to claim 2, wherein the processor obtains at least one of a touch part, the touch intensity, and touch time period as the touch information.

4. The robot according to claim 3, wherein the processor is configured to determine whether the touch type at the touch part is the first touch type or the second touch type based on whether or not the touch intensity is equal to or greater than predetermined touch intensity and whether or not the touch time period is equal to or shorter than predetermined time period threshold.

5. The robot according to claim 4, wherein the processor is configured to:
    determine that the touch type at the touch part is the second touch type when the touch intensity is equal to or greater than the predetermined intensity threshold, and the touch time period is equal to or shorter than the predetermined time period threshold, and
    control the one or more actuators so as to move the touch part further away from the predetermined object when determining that the touch type at the touch part is the second touch type.

6. The robot according to claim 4, wherein the processor is configured to:
    determine that the touch type at the touch part is the first touch type-when the touch intensity is smaller than the predetermined intensity threshold, and the touch time period is longer than the predetermined time period threshold, and
    control the one or more actuators so as to move the touch part closer to the predetermined object when determining that the touch type at the touch part is the first touch type.

7. The robot according to claim 2, wherein the processor is configured to control the one or more actuators so as to move the robot closer to the predetermined object when the touch information is not obtained for a certain time period.

8. A robot comprising:
    one or more actuators configured to move the robot;
    a processor comprising hardware; and
    a memory,
    wherein the processor is configured to:
        determine, in cooperation with one or more sensors, whether a touch type by a predetermined object is a predetermined first touch type or a predetermined second touch type, the touch type being classified in accordance with how the predetermined object touches the robot, control the one or more actuators so as to move the robot closer to the predetermined object when determining that the touch type by the predetermined object is the first touch type, or control the one or more actuators so as to move the robot further away from the predetermined object when determining that the touch type by the predetermined object is the second touch type, store in the memory touch information indicating a state of a touch by the predetermined object with the robot, read the touch information stored in the memory, and control, based on the read touch information, the one or more actuators so as to move a touch part of the robot with a high touch frequency by the predetermined object closer to the predetermined object;

recognize a face of the predetermined object, and change control in accordance with a recognition result obtained by recognizing the face of the predetermined object.

9. A robot comprising:

one or more actuators configured to move the robot;

a processor comprising hardware; and a memory, wherein the processor is configured to:

determine, in cooperation with one or more sensors, whether a touch type by a predetermined object is a predetermined first touch type or a predetermined second touch type, the touch type being classified in accordance with how the predetermined object touches the robot, acquire, in cooperation with the one or more sensors, touch frequency by the predetermined object with the robot, execute one of controls including a first control to control the one or more actuators so as to move the robot closer to the predetermined object when determining that the touch type by the predetermined object is the first touch type, and a second control to control the one or more actuators so as to move the robot further away from the predetermined object when determining that the touch type by the predetermined object is the second touch type, and in accordance with the control of the one or more actuators, repeatedly set an action mode of the robot, every predetermined time period, to one of a first action mode and a second action mode in accordance with the touch frequency acquired within the predetermined time period, and control a response by the robot to the predetermined object based on the action mode, and the first action mode and the second action mode include a first reaction that is one of a reaction to come closer to the predetermined object and a reaction to move further away therefrom, and further include a second reaction that is different from the first reaction and executed in sequence thereto, and when the operation mode is set to the first operation mode and the first reaction is the reaction to move further away from the predetermined object, the second reaction executed in sequence to the first reaction includes a repulsive action, and when the operation mode is set to the second operation mode and the first reaction is the reaction to move further away from the predetermined object, the second reaction executed in sequence to the first reaction includes a negative action.

10. The robot according to claim 9, wherein the processor is configured to:

set the action mode to the first action mode when a number of determined times that the touch type is the first touch type is less than a predetermined number of times within the predetermined time period, and a number of determined times that the touch type is the second touch type is less than the predetermined number of times within the predetermined time period, and set the action mode to the second action mode when one of conditions is satisfied, the conditions including a condition that the number of determined times that the touch type is the first touch type is equal to or greater than the predetermined number of times within the predetermined time period and a condition that the number of determined times that the touch type is the second touch type is equal to or greater than the predetermined number of times within the predetermined time period.

11. The robot according to claim 9, wherein the first action mode and the second action mode differ from each other in distributions for a decision rate.

12. The robot according to claim 10, wherein the first action mode and the second action mode differ from each other in distributions for a decision rate.

13. The robot according to claim 1, wherein the processor is configured to:

recognize the faces of a plurality of the predetermined objects, and determine a master-servant relationship and a dependent relationship among the plurality of the predetermined objects based on a recognition result obtained by recognizing the faces of the plurality of the predetermined objects, and change the control.

14. The robot according to claim 1, wherein the processor is configured to obtain environmental information containing weather, temperature, or humidity, and changes control based on the obtained environmental information.

15. The robot according to claim 1, wherein the predetermined object is a human or an animal.

16. A robot control method comprising:

determining whether a touch type by a predetermined object is a predetermined first touch type or a predetermined second touch type, the touch type being classified in accordance with how the predetermined object touches the robot;

acquiring touch intensity by the predetermined object with the robot;

controlling a movement of the robot so as to move the robot closer to the predetermined object when the touch type is determined as the first touch type, or so as to move the robot further away from the predetermined object when the touch type is determined as the second touch type, recognizing a face of the predetermined object, and changing control in accordance with a recognition result obtained by recognizing the face of the predetermined object;

wherein the movement of the robot is controlled so that the greater the acquired touch intensity is, a moving speed of the robot toward the predetermined object is higher.

17. A non-transitory computer readable recording medium having stored therein a program that causes a computer to accomplish a robot control function, the program causing the computer of the robot to:

determine whether a touch type by a predetermined object is a predetermined touch type or a predetermined second touch type, the touch type being classified in accordance with how the predetermined object touches the robot;

acquire touch intensity by the predetermined object with the robot;

control a movement of the robot so as to move the robot closer to the predetermined object when the touch type is determined as the first touch type, or so as to move the robot further away from the predetermined object when the touch type-is determined as the second touch type, recognize a face of the predetermined object, and change control in accordance with a recognition result obtained by recognizing the face of the predetermined object; wherein the movement of the robot is controlled so that the greater the acquired touch intensity is, a moving speed of the robot toward the predetermined object is higher.

* * * * *